US012211410B2

(12) United States Patent
Lee et al.

(10) Patent No.: US 12,211,410 B2
(45) Date of Patent: Jan. 28, 2025

(54) LEVEL SHIFTER AND DISPLAY DEVICE USING THE SAME

(71) Applicant: LG Display Co., Ltd., Seoul (KR)

(72) Inventors: Sang Uk Lee, Paju-si (KR); Jae Kwon Chae, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/384,535

(22) Filed: Oct. 27, 2023

(65) Prior Publication Data

US 2024/0212540 A1 Jun. 27, 2024

(30) Foreign Application Priority Data

Dec. 23, 2022 (KR) ........................ 10-2022-0182439

(51) Int. Cl.
*G09G 3/00* (2006.01)

(52) U.S. Cl.
CPC ..... *G09G 3/007* (2013.01); *G09G 2310/0289* (2013.01); *G09G 2310/0291* (2013.01); *G09G 2310/0297* (2013.01); *G09G 2310/08* (2013.01); *G09G 2330/06* (2013.01)

(58) Field of Classification Search
CPC ........... G09G 3/007; G09G 2310/0289; G09G 2310/0291; G09G 2310/0297; G09G 2310/08; G09G 2330/06
See application file for complete search history.

(56) References Cited

U.S. PATENT DOCUMENTS

| | | | | |
|---|---|---|---|---|
| 11,081,036 | B1 * | 8/2021 | Wang | H03K 5/24 |
| 2021/0020137 | A1 * | 1/2021 | Jang | G09G 3/3688 |
| 2021/0097939 | A1 * | 4/2021 | Chae | G09G 3/3688 |
| 2021/0201740 | A1 * | 7/2021 | Kim | G09G 3/20 |
| 2022/0284842 | A1 * | 9/2022 | Chen | G09G 3/20 |

FOREIGN PATENT DOCUMENTS

| | | |
|---|---|---|
| KR | 10-2020-0069551 A | 6/2020 |
| KR | 10-2020-0072769 A | 6/2020 |
| KR | 10-2021-0081008 A | 7/2021 |
| KR | 10-2021-0085983 A | 7/2021 |

* cited by examiner

*Primary Examiner* — Hong Zhou
(74) *Attorney, Agent, or Firm* — Birch, Stewart, Kolasch & Birch, LLP

(57) ABSTRACT

A level shifter according to an embodiment and a display device using the same are discussed. The level shifter includes a driving signal generation circuit configured to output driving signals through signal lines, and a pseudo signal generation circuit configured to generate phase-inverted pseudo signals of the driving signals. The pseudo signal generation circuit can raise or lower a voltage level of the pseudo signals by a variation magnitude adjusted according to the driving signals whenever a section with the driving signals overlapping on a time axis occurs.

20 Claims, 20 Drawing Sheets

FIG. 16
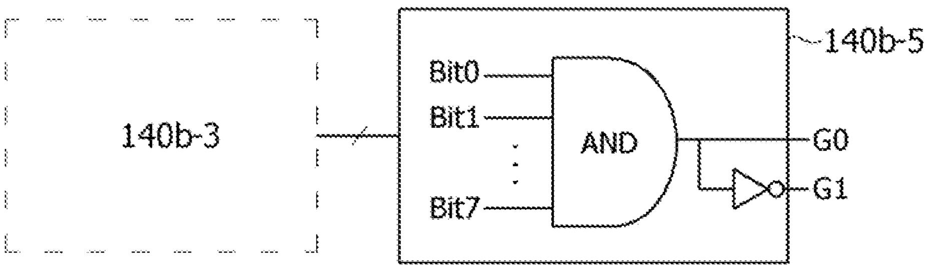
FIG. 17
| | Slew Rate | Value |
|---|---|---|
| CS1 | 255 | G0 : H<br>G1 : L |
| CS2 | 50 | G0 : L<br>G1 : H |
| CS3 | 66 | G0 : L<br>G1 : H |
FIG. 18
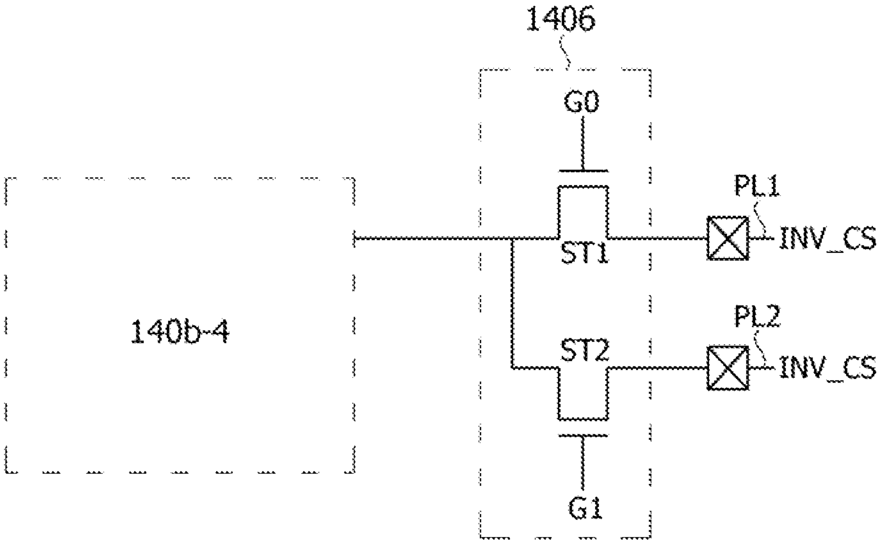

LEVEL SHIFTER AND DISPLAY DEVICE USING THE SAME

CROSS-REFERENCE TO RELATED APPLICATION

This application claims priority to Korean Patent Application No. 10-2022-0182439 filed in the Republic of Korea on Dec. 23, 2022, the disclosure of which is hereby expressly incorporated by reference in their entirety and for all purposes as if fully set forth herein into the present application.

BACKGROUND

1. Technical Field

The present disclosure relates to a level shifter and a display device using the same.

2. Discussion of Related Art

Display devices include a liquid crystal display (LCD) device, a quantum dot light emitting display device (QLED), an electroluminescence display device such as an organic light emitting display device (OLED), a field emission display (FED) device, a plasma display panel (PDP), and the like.

Electroluminescent display devices are divided into inorganic light emitting display devices and organic light emitting display devices according to the material of a light emitting layer. An active-matrix type organic light emitting display device reproduces an input image using a self-emissive element which emits light by itself, for example, an organic light emitting diode (OLED). An organic light emitting display device has advantages in that a response speed is fast and luminous efficiency, luminance, and a viewing angle are large.

Some of the display devices, for example, a liquid crystal display device or an organic light emitting display device, include a display panel having a plurality of sub-pixels, a driver outputting a driving signal for driving the display panel, a power supply generating power to be supplied to the display panel or the driver, and the like. The driver includes a gate driver that supplies a scan signal or a gate signal to the display panel, and a data driver that supplies a data signal to the display panel, but is not limited thereto, and can further include a scan driver, a touch sensing driver and the like.

The data signal output from the channels of the data driver can be supplied to data lines connected to sub-pixels directly or through a demultiplexer provided between the data driver and the data lines. In this case, multiplex signals or multiplexer signals (MUX) to be supplied to a demultiplexer (DEMUX) and clock signals to be supplied to the gate driver can be generated by a level shifter and supplied.

SUMMARY OF THE DISCLOSURE

Since electromagnetic interference (EMI) can be generated by the driving signals supplied from the level shifter, signals having phases that are inverted to phases of the driving signals are output together to offset the EMI. However, when an overlapping section occurs on a time axis between the driving signals, even when the signals having phases that are inverted to phases of the driving signals are output, EMI in the overlapping section may not be completely offset.

Accordingly, the present disclosure is to solve or address all the above-described necessity, limitation and problems and other limitations associated with the related art.

The present disclosure is to provide a level shifter capable of improving electromagnetic interference (EMI) elimination and a display device using the same.

It should be noted that objects of the present disclosure are not limited to the above-described objects, and other objects of the present disclosure will be apparent to those skilled in the art from the following descriptions.

A level shifter according to an exemplary embodiment of the present disclosure includes a driving signal generation circuit configured to output a plurality of driving signals through a plurality of signal lines; and a pseudo signal generation circuit configured to generate phase-inverted pseudo signals of the driving signals, and configured to raise or lower a voltage level of the pseudo signals by a variation magnitude adjusted according to the driving signals whenever a section where the driving signals overlap on a time axis occurs.

A display device according to the exemplary embodiment of the present disclosure includes a display panel in which a plurality of signal lines and at least one pseudo signal line are formed; a driving signal generation circuit configured to output a plurality of driving signals through the plurality of signal lines; and a pseudo signal generation circuit configured to generate phase-inverted pseudo signals of the driving signals and output the generated pseudo signals to the at least one pseudo signal line, and configured to raise or lower a voltage level of the pseudo signals by a variation magnitude adjusted according to the driving signals to generate the pseudo signals whenever a section where the driving signals overlap on a time axis occurs.

According to aspects of the present disclosure, since phase-inverted pseudo signals reflecting transitions of all analog driving signals output from a level shifter are generated, even when all of the analog driving signals overlap on a time axis, an electric field of the analog driving signals can be effectively offset.

According to aspects of the present disclosure, when the analog driving signals overlap on the time axis, a magnitude of the signal is determined by reflecting a slew rate, and thus the electric field can be effectively offset in proportion to an intensity of the signal.

According to aspects of the present disclosure, since all overlapping sections between the signals are reflected, pseudo signals can be generated without increasing the number of pins of the level shifter compared to a case in which a pseudo signal is generated for each signal.

The effects of the present disclosure are not limited to the above-mentioned effects, and other effects that are not mentioned will be apparently understood by those skilled in the art from the following description and the appended claims.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which:

FIGS. 16 and 17 are exemplary views for describing a configuration and an operation of an adder shown in FIG. 15;

FIG. 18 is an exemplary view for describing a configuration and an operation of a line selection circuit shown in FIG. 15;

Figure 1:
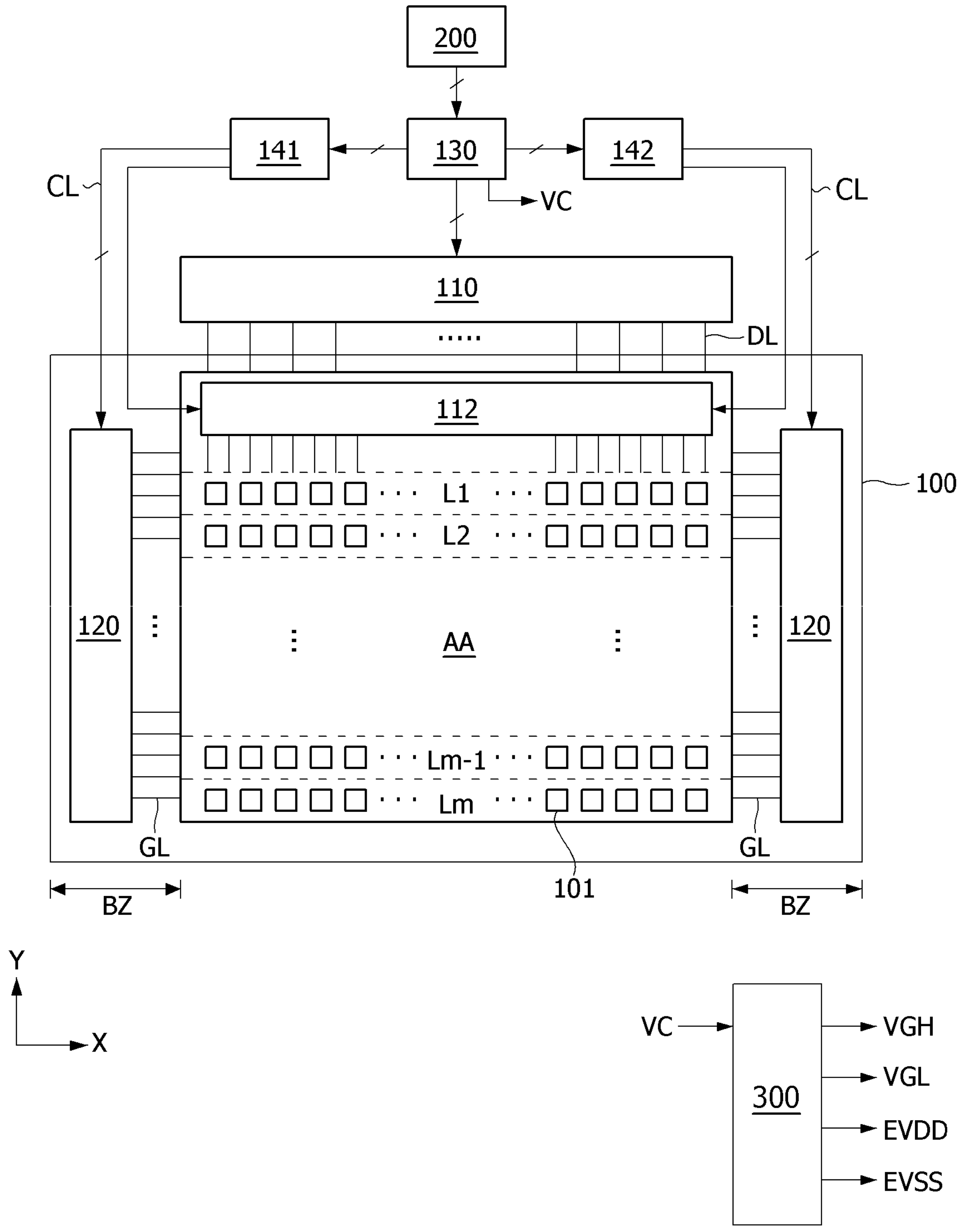
FIG. 1 is a block diagram of a display device according to an exemplary embodiment of the present disclosure.

Throughout the drawings and the detailed description, unless otherwise described, the same drawing reference numerals should be understood to refer to the same elements, features, and structures. The relative size and depiction of these elements can be exaggerated for clarity, illustration, and convenience.

DETAILED DESCRIPTION OF THE EMBODIMENTS

The advantages and features of the present disclosure and methods for accomplishing the same will be more clearly understood from embodiments described below with reference to the accompanying drawings. However, the present disclosure is not limited to the following embodiments but can be implemented in various different forms. Rather, the present embodiments will make the disclosure of the present disclosure complete and allow those skilled in the art to completely comprehend the scope of the present disclosure. The present disclosure is defined within the scope of the accompanying claims.

The shapes, dimensions, sizes, ratios, angles, numbers, and the like illustrated in the accompanying drawings for describing the embodiments of the present disclosure are merely examples, and the present disclosure is not limited thereto. Like reference numerals generally denote like elements throughout the present specification. Further, in describing the present disclosure, detailed descriptions of known related technologies can be omitted or briefly described to avoid unnecessarily obscuring the subject matter of the present disclosure.

The terms such as "comprising", "containing", "including", "having" and "consist of" used herein are generally intended to allow other components to be added unless the terms are used with the term such as "only" Any references to singular can include plural unless expressly stated otherwise.

Components are interpreted to include an ordinary error or tolerance range even if not expressly stated.

When the position relation between two components is described using the terms such as "on", "above", "over", "under", "beside", "below" "next" and the like, one or more components can be positioned between the two components unless the terms are used with the term "just", "immediately" or "directly."

The terms "first," "second," "A," "B," "(a)," and "(b)," and the like can be used to distinguish components from each other, but the functions or structures of the components are not limited by ordinal numbers or component names in front of the components. Further, when an element or layer is "connected," "coupled," or "adhered" to another element or layer denotes that the element or layer can not only be directly connected, coupled or adhered to the other element or layer, but also be indirectly connected, coupled or adhered to the other element or layer with one or more intervening elements or layers "disposed," or "interposed" between the elements or layers, unless otherwise specified.

The same reference numerals can refer to substantially the same elements throughout the present disclosure. The term "exemplary" is interchangeably used with and has the same or similar meaning as the term "example."

Further, a "transition of" a signal is the same as or similar to a "transition in" or "transition within" a signal. For instance, if a level of the signal moves up or down to a set amount, such can be considered a transition of the signal.

The following embodiments can be partially or entirely bonded to or combined with each other and can be linked and operated in technically various ways. The embodiments can be carried out independently of or in association with each other.

Hereinafter, various embodiments of the present disclosure will be described in detail with reference to the accompanying drawings. All the components of each display device according to all embodiments of the present disclosure are operatively coupled and configured.

FIG. 1 is a block diagram illustrating a display device according to an exemplary embodiment of the present disclosure.

Referring to FIG. 1, the display device according to the embodiment of the present disclosure includes a display panel 100 and a display panel driving circuit.

The display panel 100 includes a pixel array (active area) AA that displays an input image. Pixel data of an input image is displayed on pixels 101 of a pixel array AA. The pixel array AA includes a plurality of data lines 102, a plurality of gate lines 103 intersected with the data lines 102, and pixels arranged at the intersection of gate lines and data lines in a matrix form. Arrangement forms of the pixels 101 can include various forms such as a form in which pixels that emit the same color are shared, a stripe form, a diamond form, and the like in addition to a matrix form.

When a resolution of the pixel array AA is n*m, the pixel array AA includes n pixel columns and m pixel lines L1 to Lm crossing the pixel columns. The pixel columns include pixels disposed in a y-axis direction. The pixel lines include pixels disposed in an x-axis direction. One horizontal period 1H is a time in which one frame period is divided into the number m of pixel lines L1 to Lm. The pixel data is written to the pixels of one pixel line in one horizontal period 1H. Here, n and m are real numbers such as positive integers.

To implement color, each of the pixels can be divided into a red sub-pixel (hereinafter referred to as "R sub-pixel"), a green sub-pixel (hereinafter referred to as "G sub-pixel"), and a blue sub-pixel (hereinafter referred to as "B sub-pixel"). Each of the pixels can further include a white sub-pixel. Each of the pixels can include subpixels of other colors, such as cyan, magenta, or yellow, etc. Each of the sub-pixels 101 includes a pixel circuit. A pixel circuit includes a pixel electrode, a plurality of thin film transistors (TFTs), and a capacitor. The pixel circuit is connected to the data line DL and the gate line GL. Hereinafter, "pixel" and "sub-pixel" can be used interchangeably.

Touch sensors can be disposed on the display panel 100 to implement a touch screen and exist outside or inside the display panel 100. A touch input can be sensed using separate touch sensors or can be sensed through pixels. The touch sensors can be disposed as an on-cell type or an add-on type on the screen of the display panel or implemented as in-cell type touch sensors embedded in the pixel array AA. When the touch sensors are of the on-cell type or an add-on type, the touch sensors and the display panel 100 can be separately manufactured and/or can be combined.

The display panel driving circuit writes data of an input image to the pixels of the display panel 100 under the control of a timing controller (TCON) 130. The display panel driving circuit includes a data driver 110 supplying data signals to data lines of the pixel array, a gate driver 120 (or referred to as "scan driver") sequentially supplying gate pulses (or referred to as "scan pulses") synchronized with the data signals to gate lines (or referred to as "scan lines") of the pixel array, and a timing controller 130 for controlling operation timings of the drivers 110 and 120, and level shifters 141 and 142 connected between the timing controller 130 and the gate driver 120. The display panel driving circuit further includes a power supply 300 that generates power required for driving the pixels and the display panel driving circuit and other components.

The data driver 110 converts pixel data of the input image received as a digital signal from the timing controller 130 for every frame to an analog gamma compensation voltage to output data signals Vdata1 to Vdata3. The data driver 110 supplies the data signals Vdata1 to Vdata3 to data lines DL. The data driver 110 outputs the data signals Vdata1 to Vdata3 using a digital-to-analog converter (hereinafter referred to as "DAC") which converts the digital signal to the analog gamma compensation voltage. The analog gamma reference voltage is divided into gamma compensation voltages for respective gray scales through a voltage divider circuit. The gamma compensation voltage for each gray scale is provided to the DAC of the data driver 110. Data drivers 110 can be integrated into source drive integrated circuits (IC) 110*a* shown in FIG. 2. The source drive ICs 110*a* can be mounted on chips on films (COFs) 110*b* and connected between source printed circuit boards (PCBs) 152 and 153 and a display panel 100. The source driver integrated circuit can also be connected to the display panel 100 by a tape automated bonding (TAB) method, can be connected to a bonding pad of the display panel 110 by a chip on glass (COG) or chip on panel (COP) method. A touch sensor driver for driving touch sensors can be embedded in each of the source drive ICs 110*a*.

The display panel driving circuit can further include a de-multiplexer array 112 disposed between the data driver 110 and data lines DL. The data voltage output from channels of the data driver can be applied to the data lines connected to the pixels of the pixel array AA through the de-multiplexer array 112, or can be directly applied to the data lines, in which case the de-multiplexer array can be omitted.

The de-multiplexer array 112 sequentially connects one channel of the data driver 110 to the plurality of data lines 102 using a plurality of de-multiplexers (DEMUX) and distributes in a time division manner the data voltage outputted from one channel of the data driver 110 to the data lines DL, thereby reducing the number of channels of the data driver 110. The de-multiplexer array 112 can include a plurality of switch elements disposed on the display panel.

Gate drivers 120 can be formed in one side or both sides of bezel regions BZ (also referred to non-display area) in an X-direction, where an image is not displayed, in the display panel 100, or can be at least partially disposed in a pixel array AA. The gate drivers 120 receive clocks received from level shifters 141 and 142 and sequentially output a gate pulse GATE. The gate pulse GATE is supplied to gate lines GL under the control of the timing controller 130. The gate driver can be formed in the non-display area of the display panel 110 as a gate in panel (GIP) type. The gate driver can be connected to the substrate in cases of the chip on glass (COG) type, the chip on film (COF) type, a tape automated bonding (TAB) method or the like.

The gate pulse GATE applied to the gate lines GL turns on switch elements of sub-pixels 101 to select pixels to which voltages of the data signals Vdata1 to Vdata3 are charged. The switch elements of the sub-pixels 101 are turned on in response to a gate-on voltage VGH of the gate pulse GATE and turned off according to a gate-off voltage VGL. The gate pulse GATE swings between the gate-on voltage VGH and the gate-off voltage VGL. The gate drivers 120 shift the gate pulse using a shift register. The gate-on voltage can be set higher than the threshold voltage of the switch element. The gate-off voltage can be set lower than the threshold voltage of the switch element, but embodiments are not limited thereto. Depending on types of switch element (e.g., p-channel metal-oxide semiconductor (P-MOS) transistor), the gate-on voltage can be set lower than the threshold voltage of the switch element and the gate-off voltage can be set higher than the threshold voltage of the switch element.

The timing controller 130 multiplies an input frame frequency by i and controls the operation timing of the display panel driving circuit with a frame frequency of the input frame frequency×i (i is a positive integer greater than 0) Hz. The input frame frequency is 60 Hz in the NTSC (National Television Standards Committee) scheme and 50 Hz in the PAL (Phase-Alternating Line) scheme, but is not limited thereto. In order to lower a refresh rate of the pixels P in the low-speed driving mode, the timing controller 130 can lower the frame frequency into a frequency ranging from 1 Hz to 30 Hz.

The timing controller 130 receives, from an external system such as a host system 200, pixel data of an input image and a timing signal synchronized therewith. The pixel data of the input image received by the timing controller 130 can be a digital signal. The timing controller 130 transmits the pixel data to the data driver 110. The timing signal includes a vertical synchronization signal Vsync, a horizontal synchronization signal Hsync, a main clock CLK, a data enable signal DE, and the like. Because a vertical period and a horizontal period can be known by counting the data enable signal DE, the vertical synchronization signal Vsync and the horizontal synchronization signal Hsync can be omitted. The data enable signal DE can define a time for which the image data DATA is transferred in the vertical period or the horizontal period. The horizontal synchronization signal Hsync and data enable signal DE can have a cycle of one horizontal period (1H). The timing controller 130 can generate a data timing control signal DDC for controlling an operation timing of the data driver 110 based on the timing signal received from a host system 200, a gate timing control signal for controlling an operation timing of the gate driver 120, a control signal for controlling an operation timing of switch elements of a demultiplexer array 112, and the like. Gate timing control signals can be generated as clocks of a digital signal voltage level. The data timing control signal DDC can include, a source sampling clock, a polarity control signal, a source output enable signal and the like. The source sampling clock SSC is a clock for sampling the image data DATA, and the source output enable signal is a signal for setting an output timing (i.e., a source output timing) of a data voltage.

The host system 200 can be any one of a television (TV), a tablet computer, a laptop computer, a vehicle system, a set-top box, a navigation system, a personal computer (PC), a home theater, a mobile system, and a wearable system. In a mobile device and a wearable device, the data driver 110, the timing controller 130, the level shifter 140, and the like can be integrated into one drive IC. In the mobile system, the host system 200 can be implemented as an application processor (AP). The host system 200 can transmit the pixel data of the input image to the drive IC through a mobile industry processor interface (MIPI). The host system 200 can be connected to the drive IC through a flexible printed circuit, for example, a flexible printed circuit board (FPCB).

The clocks output from the level shifters 141 and 142 swing between the gate-on voltage VGH and the gate-off voltage VGL and are supplied to the gate drivers 120 through clock lines CL. For example, the level shifters 141 and 142 can convert a voltage of the gate timing control signal GDC (for example, a start signal VST, an on clock, and an off clock), output from the timing controller 130, into a gate high voltage VGH or a gate low voltage VGL and can supply the gate high voltage VGH or the gate low voltage VGL to the gate driver 120. A low level voltage of the gate timing control signal GDC can be converted into the gate low voltage VGL, and a high level voltage of the gate timing control signal GDC can be converted into the gate high voltage VGH. The clocks output from the level shifters 141 and 142 can be applied to at least one of a demultiplexer array 112, the gate drivers 120, the data drivers 110, and the touch sensor driver.

The power supply 300 generates power required for driving the pixel array AA and the display panel driving circuit of the display panel 100 by using a DC-DC converter. The DC-DC converter can include a charge pump, a regulator, a buck converter, a boost converter, buck-boost converter, and the like. The power supply 300 adjusts a DC input voltage from the host system 200 to generate a DC voltage such as a gamma reference voltage VGMA, a gate on voltage VGH, a gate off voltage VGL, a reference voltage Vref, an initialization voltage Vinit, a common voltage of the pixels, or the like. Depending on the type of the transistor, gate on and gate off voltages can be different. A power supply 300 can generate a constant voltage commonly applied to the pixels, for example, a pixel driving voltage EVDD the reference voltage Vref, the initialization voltage Vinit and a pixel base voltage EVSS. The power supply 300 can change a voltage level of an output voltage according to control signals VC generated from a timing controller 130.

Figure 2:
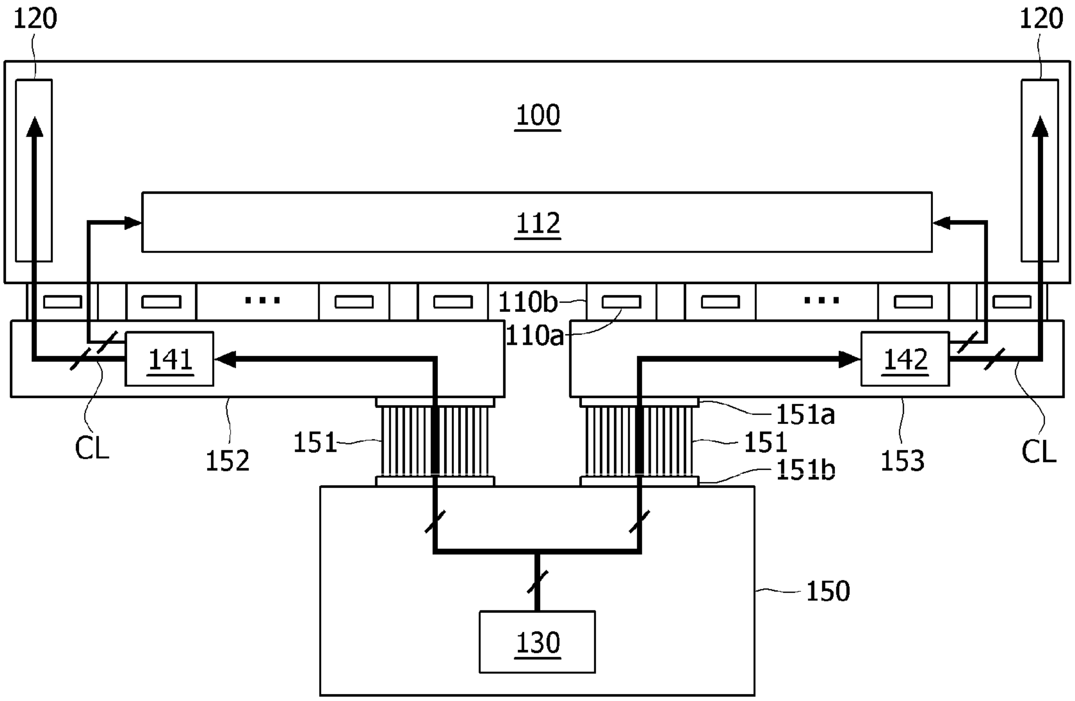
FIG. 2 is an exemplary view illustrating an arrangement form of level shifters in the display device shown in FIG. 1.

FIG. 2 is an exemplary view illustrating an arrangement form of level shifters in the display device shown in FIG. 1.

Referring to FIG. 2, a control board 150 can be connected to flexible circuit boards, for example, first and second source printed circuit boards (PCBs) 152 and 153 through a flexible flat cable (FFC) 151 and connectors 151*a* and 151*b*. The source drive ICs 110*a* are connected between the source PCBs 152 and 153 and the display panel 100. The total number of flexible circuit boards is not limited to two, and can be any integer as needed.

The timing controller 130 can be mounted on the control board 150.

The level shifters 141 and 142 can be respectively mounted on the source PCBs 152 and 153. In this case, the level shifters 141 and 142 include a first level shifter 141 mounted on a first source PCB 152 and a second level shifter 142 mounted on a second source PCB 153. Input terminals of the level shifters 141 and 142 are connected to the timing controller 130 through lines which connect the control board 150, the FFC 151, and the source PCBs 152 and 153. Output terminals of the level shifters 141 and 142 can be connected to the gate drivers 120 through lines which connect the source PCBs 152 and 153, the COFs 110*b*, and the gate drivers 120 on the display panel 100.

Figure 3:
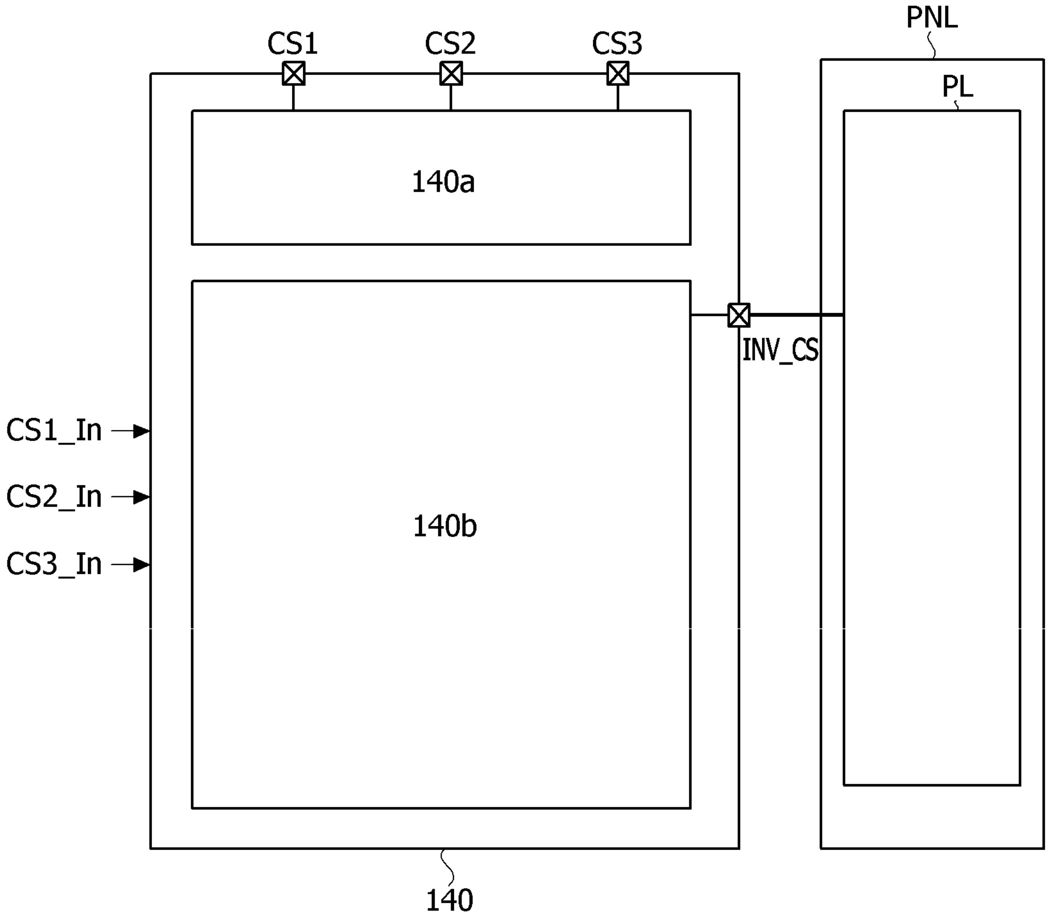
FIG. 3 is an exemplary view for describing an operation of a level shifter according to a first exemplary embodiment of the present disclosure.

FIG. 3 is a view for describing an operation of a level shifter according to a first exemplary embodiment of the present disclosure.

Referring to FIG. 3, a level shifter 140 according to the first embodiment of the present disclosure can include a driving signal generation circuit 140*a*, a pseudo signal generation circuit 140*b*, and a pseudo signal line PL.

The driving signal generation circuit 140*a* can generate analog driving signals (hereinafter referred to as driving signals) CS1, CS2, and CS3 according to control signals CS1_In, CS2_In, and CS3_In from a timing controller and output the driving signals CS1, CS2, and CS3 to a demultiplexer array or gate driver. Here, the driving signals can include a multiplex signal MUX and a clock signal CLK. The total number of analog driving signals is not limited to three, and can be any integer larger than one.

For example, the driving signal generation circuit 140*a* can receive T MUX signals TMUX from the timing controller to generate multiplex signals MUX, and output the multiplex signals MUX to the demultiplexer array.

As another example, the driving signal generation circuit 140*a* can receive T clock signals TCLK from the timing controller to generate clock signals CLK, and output the clock signals CLK to the gate driver.

The pseudo signal generation circuit 140*b* can generate a pseudo signal INV_CS capable of offsetting an electric field of the driving signals based on the driving signals CS1, CS2, and CS3 output from the driving signal generation circuit 140*a*, and output the pseudo signal INV_CS to the pseudo signal line PL formed on a display panel PNL.

Figure 4:
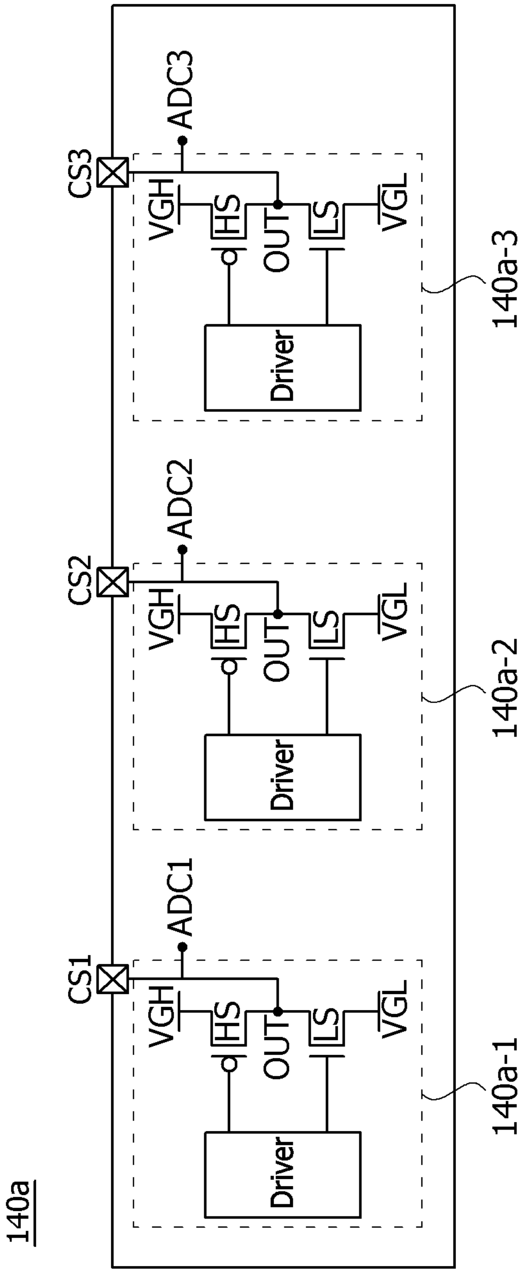
FIG. 4 is an exemplary view illustrating a detailed configuration of a driving signal generation circuit shown in FIG. 3.

FIG. 4 is an exemplary view illustrating a detailed configuration of a driving signal generation circuit shown in FIG. 3.

Referring to FIG. 4, the driving signal generation circuit 140*a* according to the embodiment can include a plurality of circuit blocks 140*a*-1, 140*a*-2, and 140*a*-3, and each of the circuit blocks 140*a*-1, 140*a*-2, and 140*a*-3 can output the driving signal. The total number of circuit blocks is not limited to three, and can be any integer larger than one.

Each of the circuit blocks 140*a*-1, 140*a*-2, and 140*a*-3 can include a pull-up transistor HS and a pull-down transistor LS. Here, the pull-up transistor HS can be implemented as a p-type transistor, and the pull-down transistor LS can be implemented as an n-type transistor, but is not limited thereto. Alternatively, the pull-up transistor HS can be implemented as an n-type transistor, and the pull-down transistor LS can be implemented as a p-type transistor. Each of the circuit blocks 140*a*-1, 140*a*-2, and 140*a*-3 turns on the pull-up transistor HS and the pull-down transistor LS to output the driving signal in a pulse form.

For example, when the pull-up transistor HS is turned on and the pull-down transistor LS is turned off, a voltage of an output terminal OUT is charged to a gate-on voltage VGH. When the pull-up transistor HS is turned off and the pull-down transistor LS is turned on, the voltage of the output node OUT is discharged to the gate-off voltage VGL.

Figure 5:
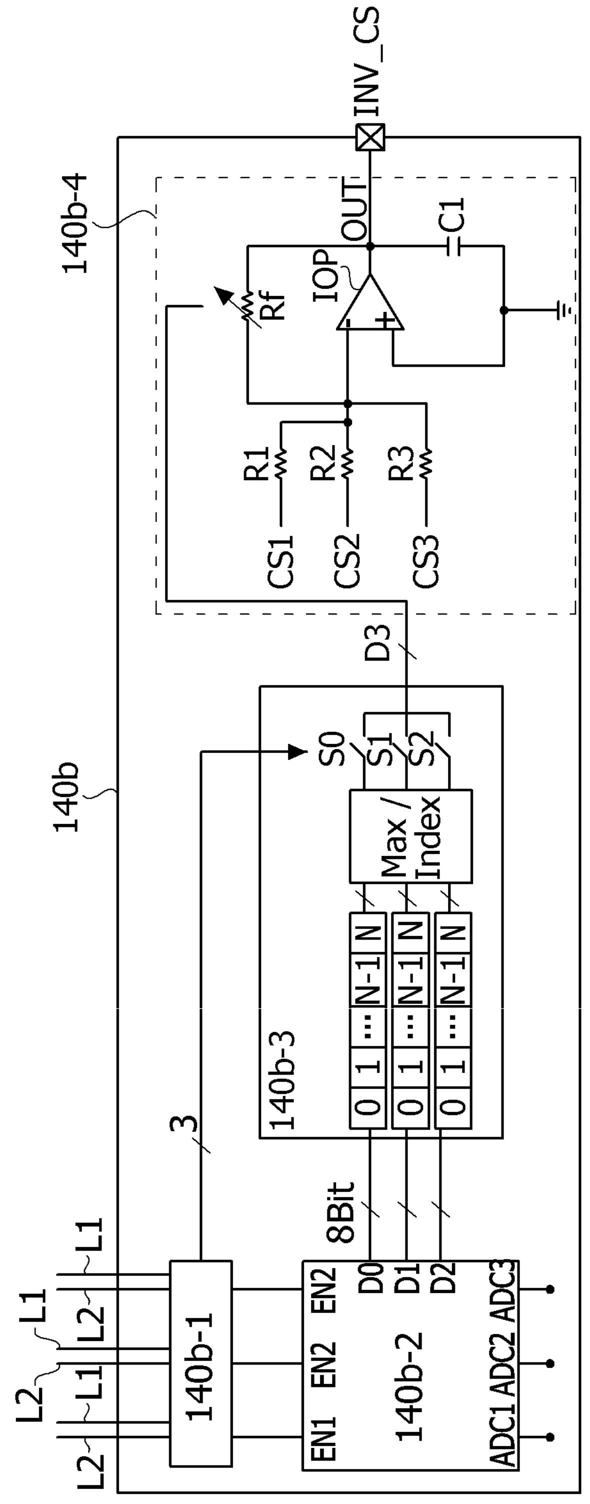
FIG. 5 is an exemplary view illustrating a detailed configuration of a pseudo signal generation circuit shown in FIG. 3.
Figure 6:
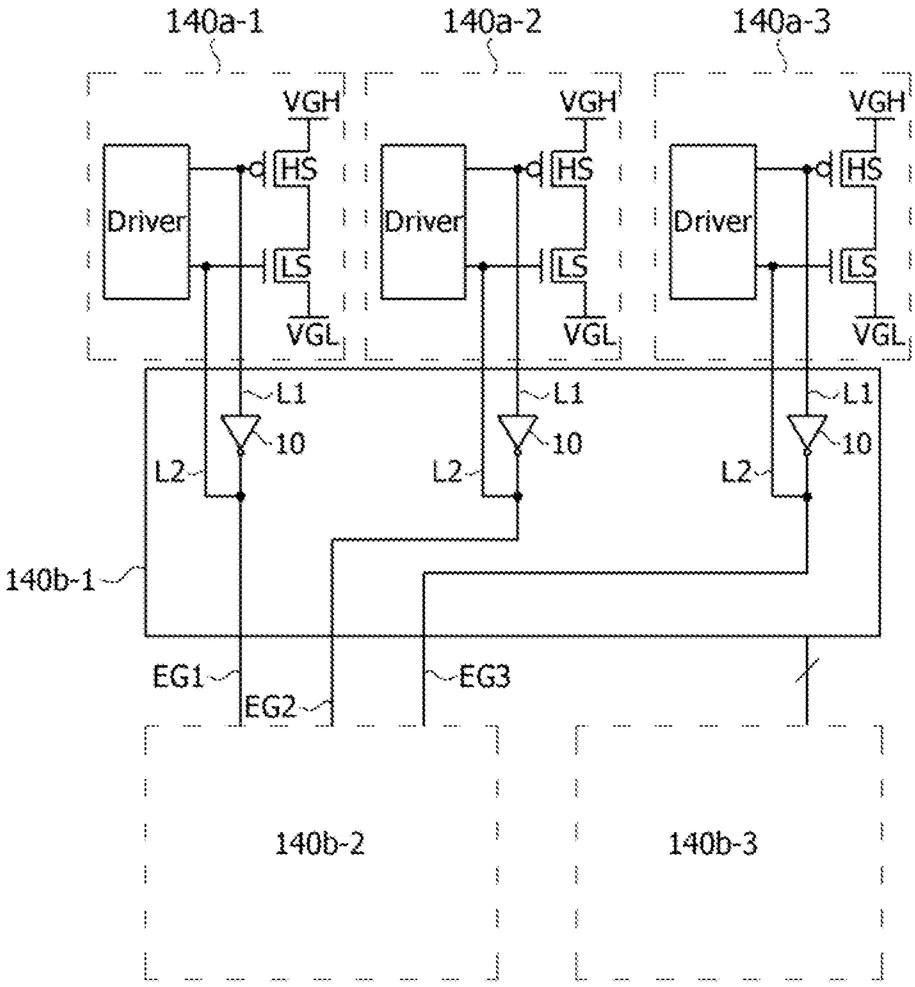
FIG. 6 is an exemplary view for describing a configuration and an operation of an edge detection circuit shown in FIG. 5.
Figure 7:
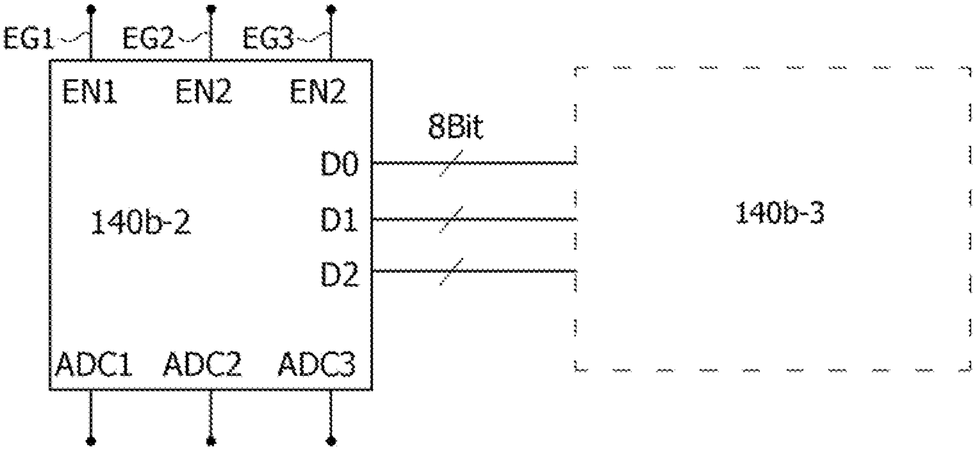
FIG. 7 is an exemplary view for describing a configuration and an operation of a voltage measurement circuit shown in FIG. 5.
Figure 8A:
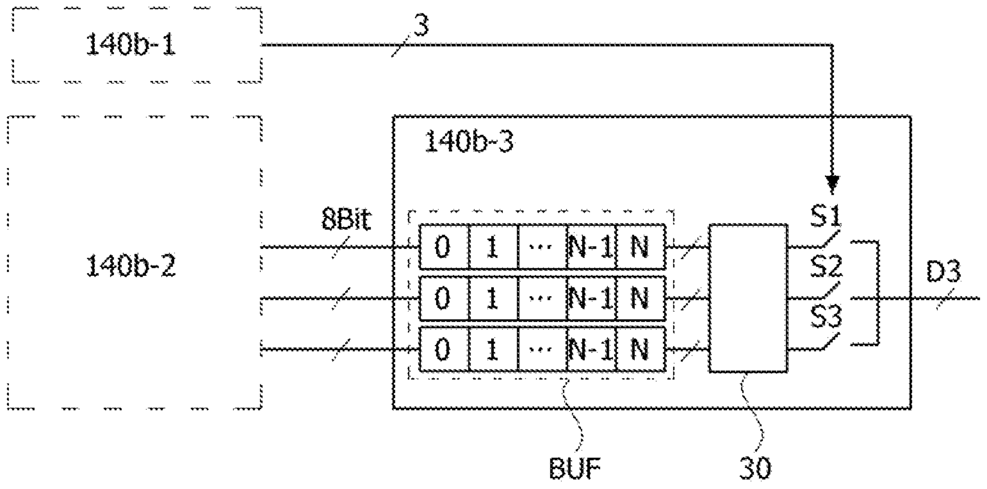
FIGS. 8A and 8B are exemplary views for describing a configuration and an operation of a slew rate calculation circuit shown in FIG. 5.
Figure 8B:
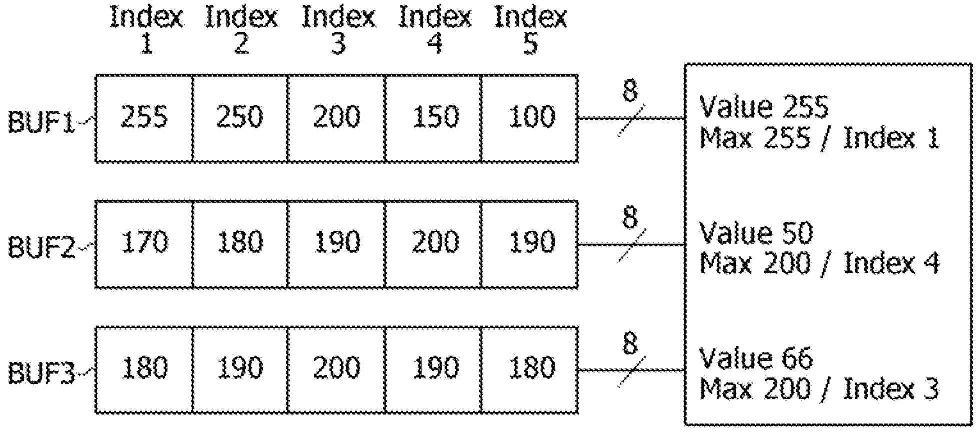
Figure 9:
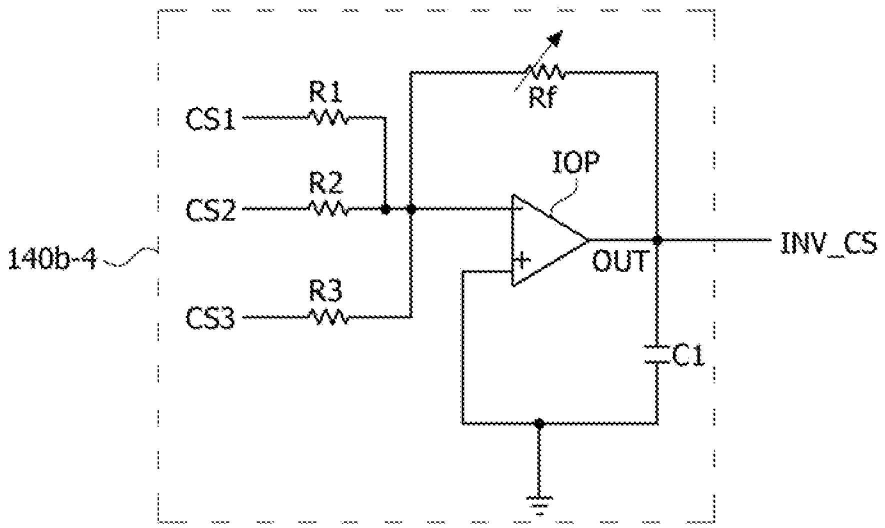
FIG. 9 is an exemplary view for describing a configuration and an operation of a signal inverting circuit shown in FIG. 5.

FIG. 5 is an exemplary view illustrating a detailed configuration of a pseudo signal generation circuit shown in FIG. 3, FIG. 6 is an exemplary view for describing a configuration and an operation of an edge detection circuit shown in FIG. 5, FIG. 7 is an exemplary view for describing a configuration and an operation of a voltage measurement circuit shown in FIG. 5, FIGS. 8A and 8B are exemplary views for describing a configuration and an operation of a slew rate calculation circuit shown in FIG. 5, and FIG. 9 is an exemplary view for describing a configuration and an operation of a signal inverting circuit shown in FIG. 5.

Referring to FIGS. 5 to 9, the pseudo signal generation circuit 140*b* according to the first embodiment can include an edge detection circuit 140*b*-1, a voltage measurement circuit 140*b*-2, a slew rate calculation circuit 140*b*-3, and a signal inverting circuit 140*b*-4.

The edge detection circuit 140*b*-1 can be connected to each of the circuit blocks 140*a*-1, 140*a*-2, and 140*a*-3 to detect a rising edge and a falling edge of the driving signal.

As shown in FIG. 6, an input end of the edge detection circuit 140*b*-1 is connected to a gate electrode of the pull-up transistor HS in each of the circuit blocks 140*a*-1, 140*a*-2, and 140*a*-3 through a first line L1, and an input end of the edge detection circuit 140*b*-1 is connected to a gate electrode of the pull-down transistor LS in each of the circuit blocks 140*a*-1, 140*a*-2, and 140*a*-3 through a second line L2, and an inverter 10 is disposed on the first line L1.

The edge detection circuit 140*b*-1 detects edges according to the gate-on voltage and the gate-off voltage input to the pull-up transistor HS and the pull-down transistor LS of each of the circuit blocks 140*a*-1, 140*a*-2, and 140*a*-3 and outputs edge detection signals.

For example, the edge detection circuit 140*b*-1 detects a rising edge to output edge detection signals as a value of '1' is input to an input end when the pull-up transistor HS of each of the circuit blocks 140*a*-1, 140*a*-2, and 140*a*-3 is turned on by the gate-off voltage and the pull-down transistor LS is turned off by the gate-off voltage.

As another example, the edge detection circuit 140*b*-1 detects a falling edge and outputs edge detection signals as a value of '1' is input to the input end when the pull-up transistor HS of each of the circuit blocks 140*a*-1, 140*a*-2, and 140*a*-3 is turned off by the gate-on voltage and the pull-down transistor LS is turned on by the gate-off voltage.

The voltage measuring circuit 140*b*-2 outputs a voltage value of the driving signal measured through the output terminal OUT of each circuit block according to the edge detection signals output from the edge detection circuit 140*b*-1.

As shown in FIG. 7, the voltage measurement circuit 140*b*-2 measures voltage values of the driving signals output through the output terminals OUT of the circuit blocks 140*a*-1, 140*a*-2, and 140*a*-3 of FIG. 4 through terminals ADC1, ADC2, and ADC3, respectively, and receives edge detection signals EG1, EG2, and EG3 output from the edge detection circuit 140*b*-1 through terminals EN1, EN2, and EN3 to output the voltage values of the driving signals respectively measured through the output terminals OUT of each of the circuit blocks 140*a*-1, 140*a*-2, and 140*a*-3 according to the received edge detection signals EG1, EG2, and EG3, through terminals D0, D1, and D3.

The voltage measurement circuit 140*b*-2 can periodically measure the voltage value of the driving signal output through the output terminal OUT of each of the circuit blocks 140*a*-1, 140*a*-2, and 140*a*-3 for a predetermined time and output the voltage value. The voltage value of the driving signal output from the voltage measurement circuit 140*b*-2 can be 8-bit data, but is not limited thereto, and can be of any bit length.

For example, the voltage measurement circuit 140*b*-2 outputs the voltage value of the driving signal measured through the output terminal OUT of a first circuit block 140*a*-1 according to the edge detection signal EG1, as the 8-bit data through the terminal D0, outputs the voltage value of the driving signal measured through the output terminal OUT of a second circuit block 140*a*-2 according to the edge detection signal EG2, as the 8-bit data through the terminal D1 and outputs the voltage value of the driving signal measured through the output terminal OUT of a third circuit block 140*a*-3 according to the edge detection signal EG3, as the 8-bit data through the terminal D2.

The slew rate calculation circuit 140*b*-3 can calculate and output a slew rate of each circuit block. Here, the slew rate is a voltage rise amount or voltage fall amount of an analog driving signal per circuit time.

As shown in FIG. 8A, the slew rate calculation circuit 140*b*-3 includes a buffer BUF, a calculation circuit 30, a first switch S1, a second switch S2, and a third switch S3.

As shown in FIG. 8B, the buffer BUF includes a first buffer BUF1, a second buffer BUF2, and a third buffer BUF3, and 8-bit data corresponding to the voltage values of the driving signals measured by the voltage measurement circuit 140*b*-2 can be sequentially stored in each of the first buffer BUF1, the second buffer BUF2, and the third buffer BUF3.

In this case, 8-bit data corresponding to the voltage value of the driving signal output from the first circuit block 140*a*-1 is stored in the first buffer BUF1, 8-bit data corresponding to the voltage value of the driving signal output from a second circuit block 140*a*-2 is stored in the second buffer BUF2, and 8-bit data corresponding to the voltage value of the driving signal output from a third circuit block 140*a*-3 is stored in the third buffer BUF3.

The calculation circuit 30 can calculate a slew rate of each of the circuit blocks 140*a*-1, 140*a*-2, and 140*a*-3 based on the values stored in the first buffer BUF1, the second buffer BUF2, and the third buffer BUF3. Here, the slew rate can be a value acquired by dividing the maximum value by an index.

For example, as shown in FIG. 8B, the slew rate becomes 255 by dividing a maximum value of 255 among the values stored in the first buffer BUF1 by the corresponding index value 1, the slew rate becomes 50 by dividing a maximum value of 200 among the values stored in the second buffer BUF2 by the corresponding index value 4, and the slew rate becomes 66 by dividing a maximum value of 200 among the values stored in the third buffer BUF3 by the corresponding index value 3. The maximum value and the index value mentioned above are only examples, and can be any value as needed.

The calculation circuit 30 can sequentially output the 8-bit data corresponding to each of the calculated slew rates according to the edge detection signals applied from the edge detection circuit 140*b*-1. Here, the 8-bit data for the slew rate 255 is [11111111], the 8-bit data for the slew rate 50 is [01001100], and the 8-bit data for the slew rate 66 is [01000010].

The signal inverting circuit 140*b*-4 can output a pseudo signal phase-inverted based on the driving signal output from each circuit block, and can output a pseudo signal of which an intensity is adjusted according to a variation magnitude.

As shown in FIG. 9, the signal inverting circuit 140*b*-4 can include an inverting amplifier IOP, a first input resistor R1, a second input resistor R2, a third input resistor R3, a feedback resistor Rf, and a capacitor C1. Here, the first input resistor R1, the second input resistor R2, and the third input resistor R3 can have the same resistance value. The total number of input resistors is not limited to three, and can be any integer larger than one.

The first input resistor R1, the second input resistor R2, and the third input resistor R3 are connected to an inverting input end (−) of the inverting amplifier IOP in parallel.

The feedback resistor Rf is connected between an output terminal OUT and the inverting input end (−) of the inverting amplifier IOP, and can be varied by the slew rate output from the slew rate calculation circuit 140*b*-3.

A non-inverting input end (+) of the inverting amplifier IOP is connected to the ground, and the capacitor C1 is connected between the output terminal OUT of the inverting amplifier IOP and the ground.

The signal inverting circuit 140*b*-4 can generate phase-inverted pseudo signals INV_CS reflecting transitions of all analog driving signals, and can generate and output pseudo signal INV_CS of which an intensity is adjusted according to a variation magnitude.

Figure 10:
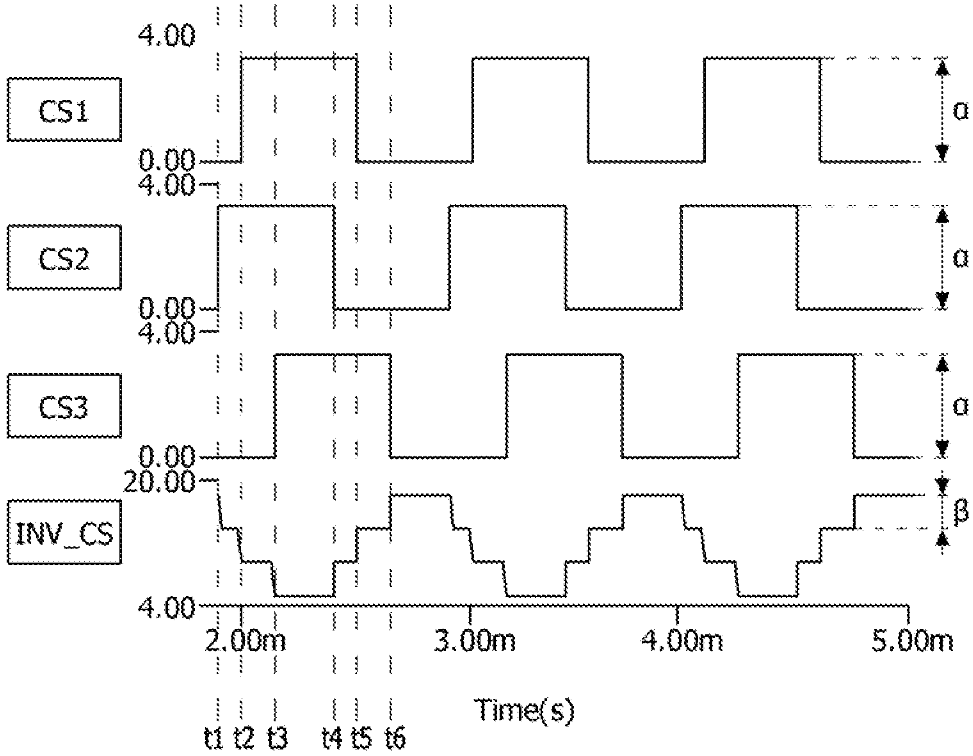
FIGS. 10 to 12 are exemplary views for describing a generation principle of pseudo signals in the level shifter.
Figure 11:
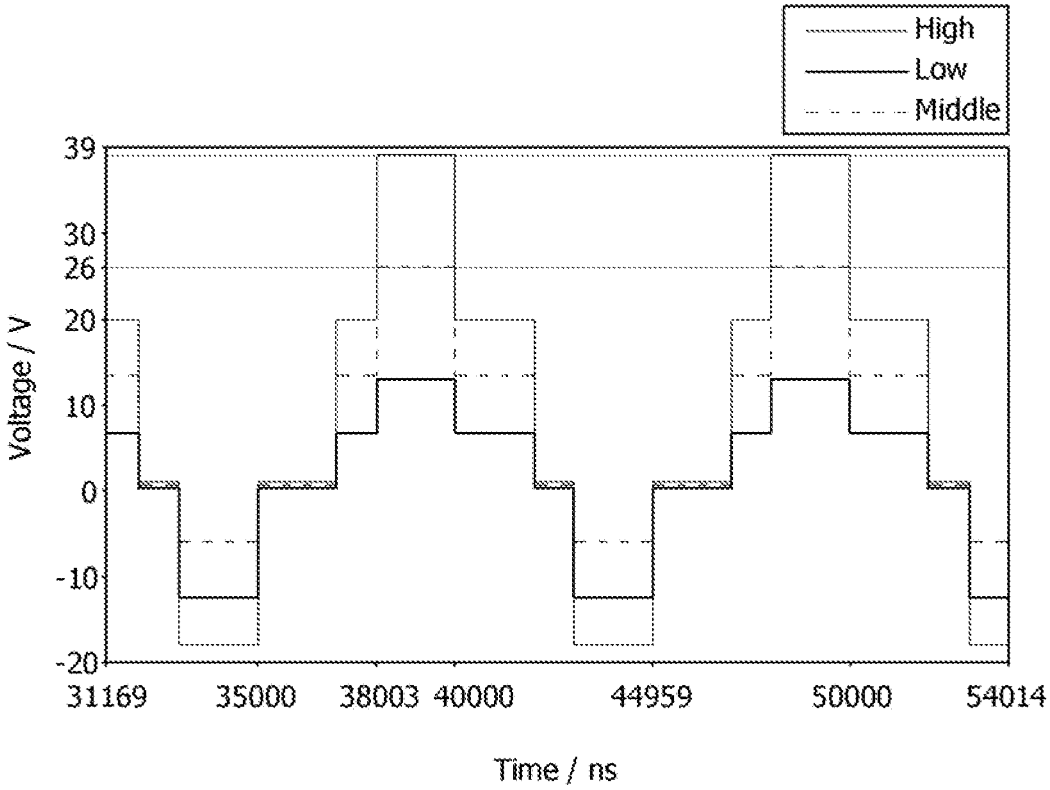
Figure 12:
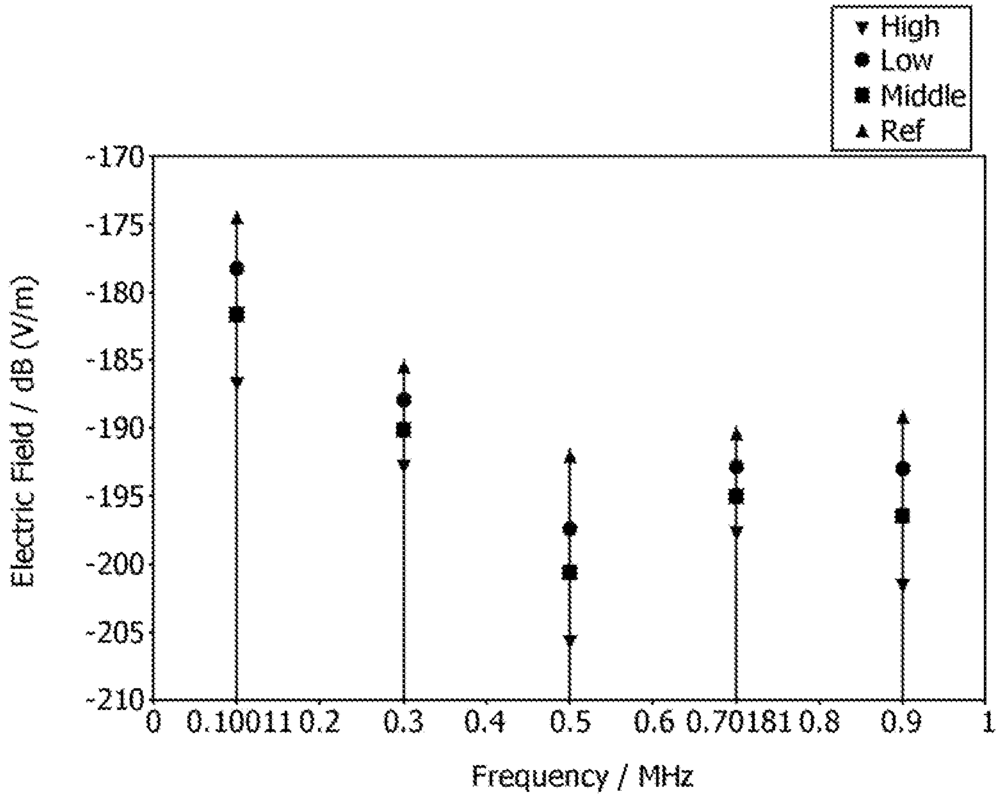

FIGS. 10 to 12 are exemplary views for describing a generation principle of the pseudo signals in the level shifter.

Referring to FIG. 10, the pseudo signals according to the embodiment can be generated based on the driving signals, and can be generated by inversion by cumulatively raising or lowering of the voltage level by a predetermined variation magnitude ß whenever a transition of the driving signals occurs, e.g., any transition within any of the driving signals.

In this case, the voltage level of the pseudo signal INV_CS can fall on the rising edge of the driving signals, and the voltage level of the pseudo signal INV_CS can rise on the falling edge of the driving signals. Alternatively, the voltage level of the pseudo signal INV_CS can rise on the rising edge of the driving signals, and the voltage level of the pseudo signal INV_CS can fall on the falling edge of the driving signals.

For example, the voltage level of the pseudo signal falls by the predetermined variation magnitude β when a transition of a second driving signal CS2 occurs at a time t1, the voltage level of the pseudo signal falls by the predetermined variation magnitude β again when a transition of a first driving signal CS1 occurs at a time t2, and the voltage level of the pseudo signal falls by the predetermined variation magnitude β again when a transition of a third driving signal CS3 occurs at a time t3.

As another example, the voltage level of the pseudo signal rises by the predetermined variation magnitude β when the transition of the second driving signal CS2 occurs at a time t4, the voltage level of the pseudo signal rises by the predetermined variation magnitude ß again when the transition of the first driving signal CS1 occurs at a time t5, and the voltage level of the pseudo signal rises by the predetermined variation magnitude β again when the transition of the third driving signal CS3 occurs at a time t6.

As described above, in the embodiment, since transitions of all of the MUX signals are reflected in the pseudo signals, the electric field can be effectively offset even when all of the MUX signals overlap on the time axis.

Referring to FIG. 11, in the embodiment, the intensity of the pseudo signals can be adjusted by adjusting the predetermined variation magnitude β in proportion to electromagnetic interference (EMI) radiation amount. Here, it is illustrated that the variation magnitude β is divided into a first variation magnitude (high), a second variation magnitude (middle) smaller than the first variation magnitude (high), and a third variation magnitude (low) smaller than the second variation magnitude (middle).

This variation magnitude ß can be adjusted in proportion to the slew rate of the driving signal.

Referring to FIG. 12, it is illustrated that EMI is improved according to the intensities of the pseudo signals of which the variation magnitudes are adjusted to the first variation magnitude (high), the second variation magnitude (middle), and the third variation magnitude (low) compared to the pseudo signal having a reference magnitude Ref, and it can be seen that the EMI radiation amount also decreases as the variation magnitude increases.

Accordingly, in the embodiment, the variation magnitude is intended to be adjusted in proportion to the EMI radiation amount.

In this case, the predetermined variation magnitude ß is smaller than a voltage difference α between a high-voltage level and a low-voltage level of the MUX signal. Generally, since the voltage difference α between the high-voltage level and the low-voltage level is 10 to 15 V, there is a physical limit to making the variation magnitude ß greater than the voltage difference α.

In response, in the embodiment, this physical limitation is intended to be overcome by adjusting line widths of the signal lines to which the pseudo signals are applied in addition to adjusting the variation magnitude β.

Figure 13A:
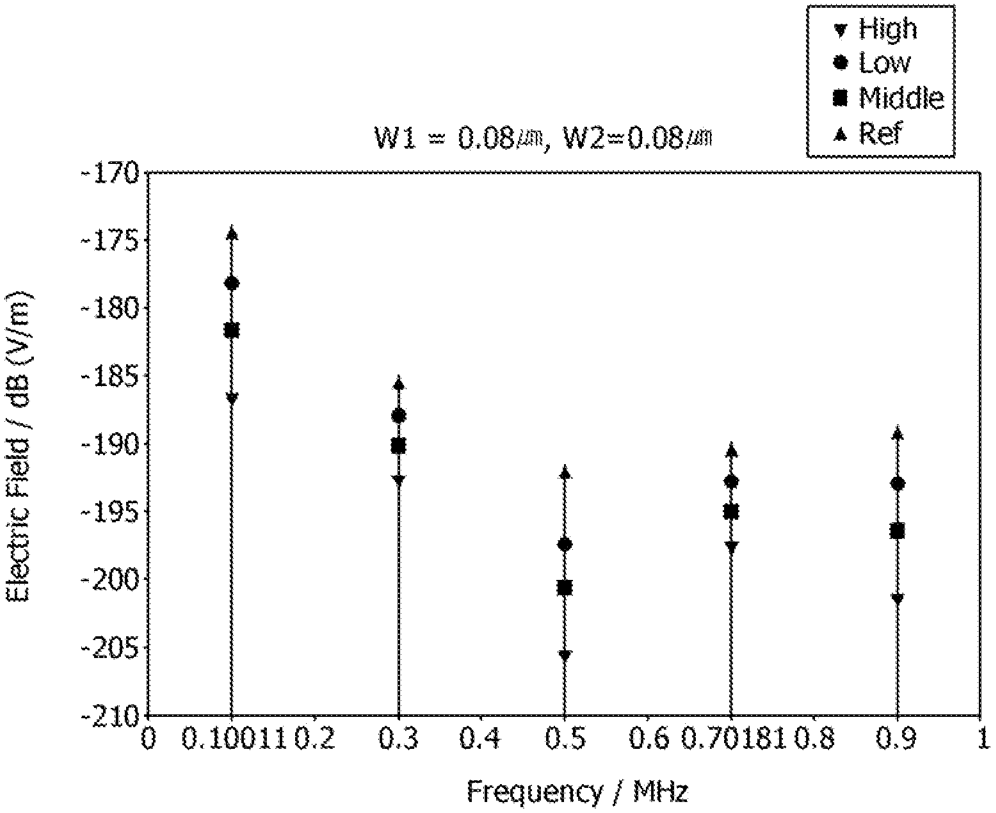
FIGS. 13A and 13B are exemplary views illustrating an electromagnetic interference (EMI) improvement effect according to line widths of signal lines.
Figure 13B:
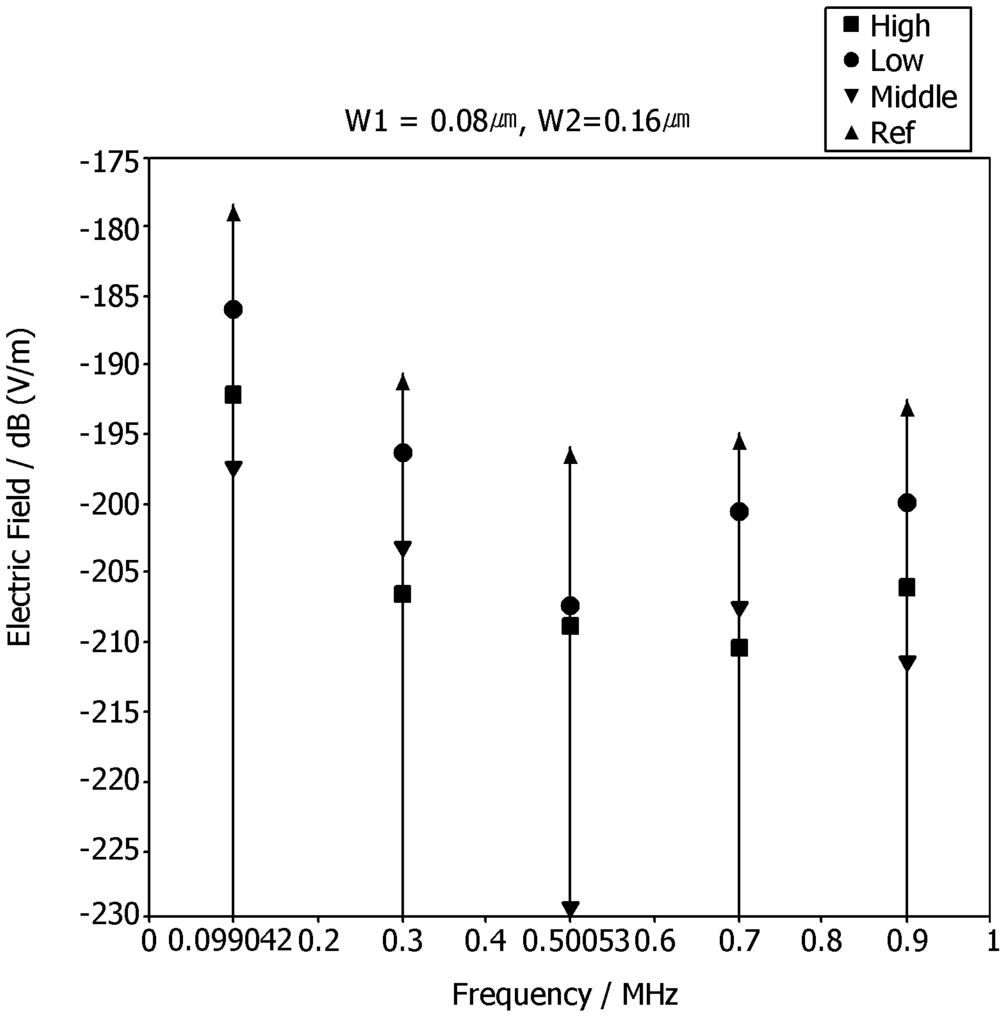

FIGS. 13A and 13B are exemplary views illustrating an electromagnetic interference (EMI) improvement effect according to line widths of signal lines.

Referring to FIG. 13A, EMI shown is an example in which a line width W1 of a signal line to which the driving signal is applied, and a line width W2 of a signal line to which the pseudo signal having the reference magnitude Ref and the pseudo signals of which the variation magnitudes are adjusted to the first variation magnitude (high), the second variation magnitude (middle), and the third variation magnitude (low) are applied are formed as the same width of 0.08 μm is illustrated.

When the line widths of the two signal lines are the same while the intensity of the pseudo signal is adjusted, it can be seen that the EMI radiation amount is small and thus it is more effective for the EMI as the variation magnitude is large.

Referring to FIG. 13B, EMI shown is an example in which the line width W1 of the signal line to which the driving signal is applied is formed to be 0.08 μm, and the line width W2 of the signal line to which the pseudo signal having the reference magnitude Ref and the pseudo signals of which the variation magnitudes are adjusted to the first variation magnitude (high), the second variation magnitude (middle), and the third variation magnitude (low) are applied are formed to be 0.16 μm is illustrated.

When the line widths of the two signal lines are different while the intensity of the pseudo signal is adjusted, it can be seen that the EMI radiation amount is small and thus it is more effective for the EMI as the variation magnitude is large. Here, the smallest EMI radiation amount is shown in the case in which the variation magnitude is in the middle than the case in which the variation magnitude is the highest, which means that the line width of the signal line affects the EMI.

Accordingly, in the embodiment, the line width of the signal line is intended to be adjusted in addition to the variation magnitude.

Figure 14:
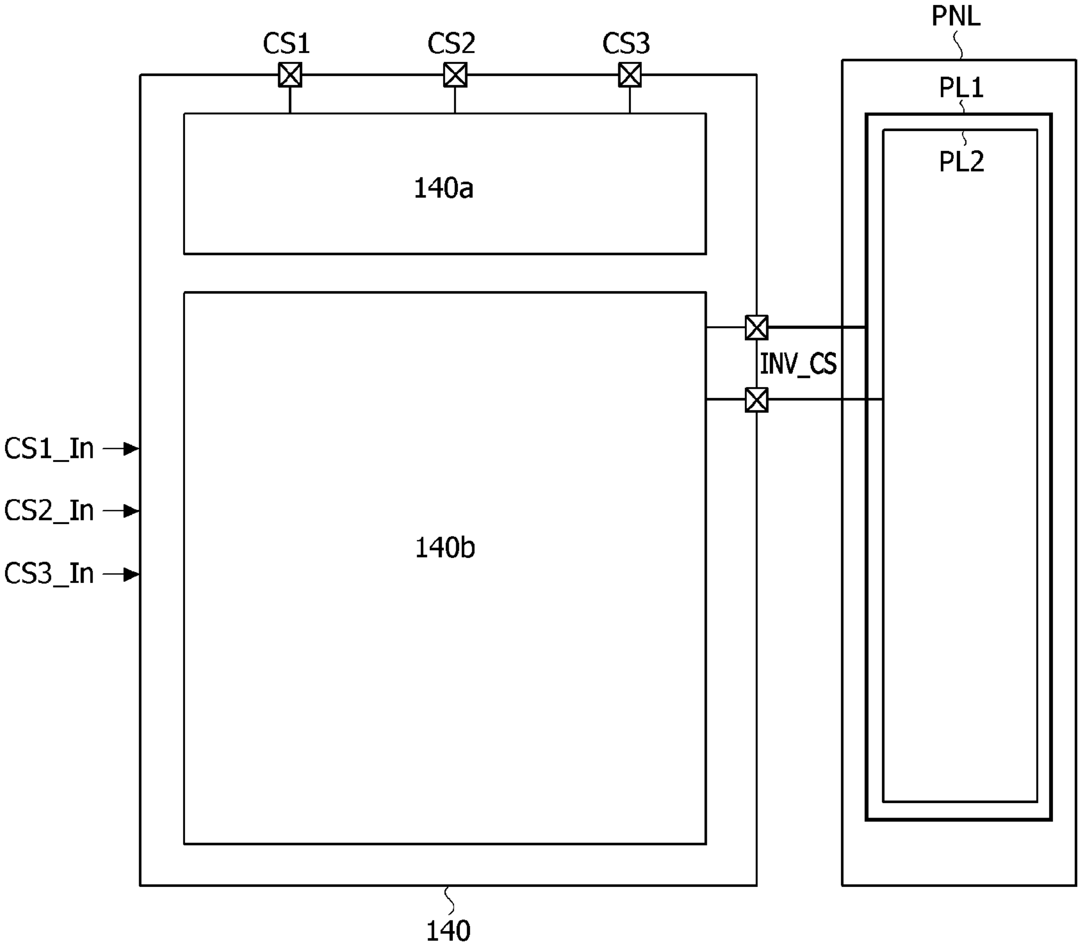
FIG. 14 is an exemplary view for describing an operation of a level shifter according to a second exemplary embodiment of the present disclosure.
Figure 15:
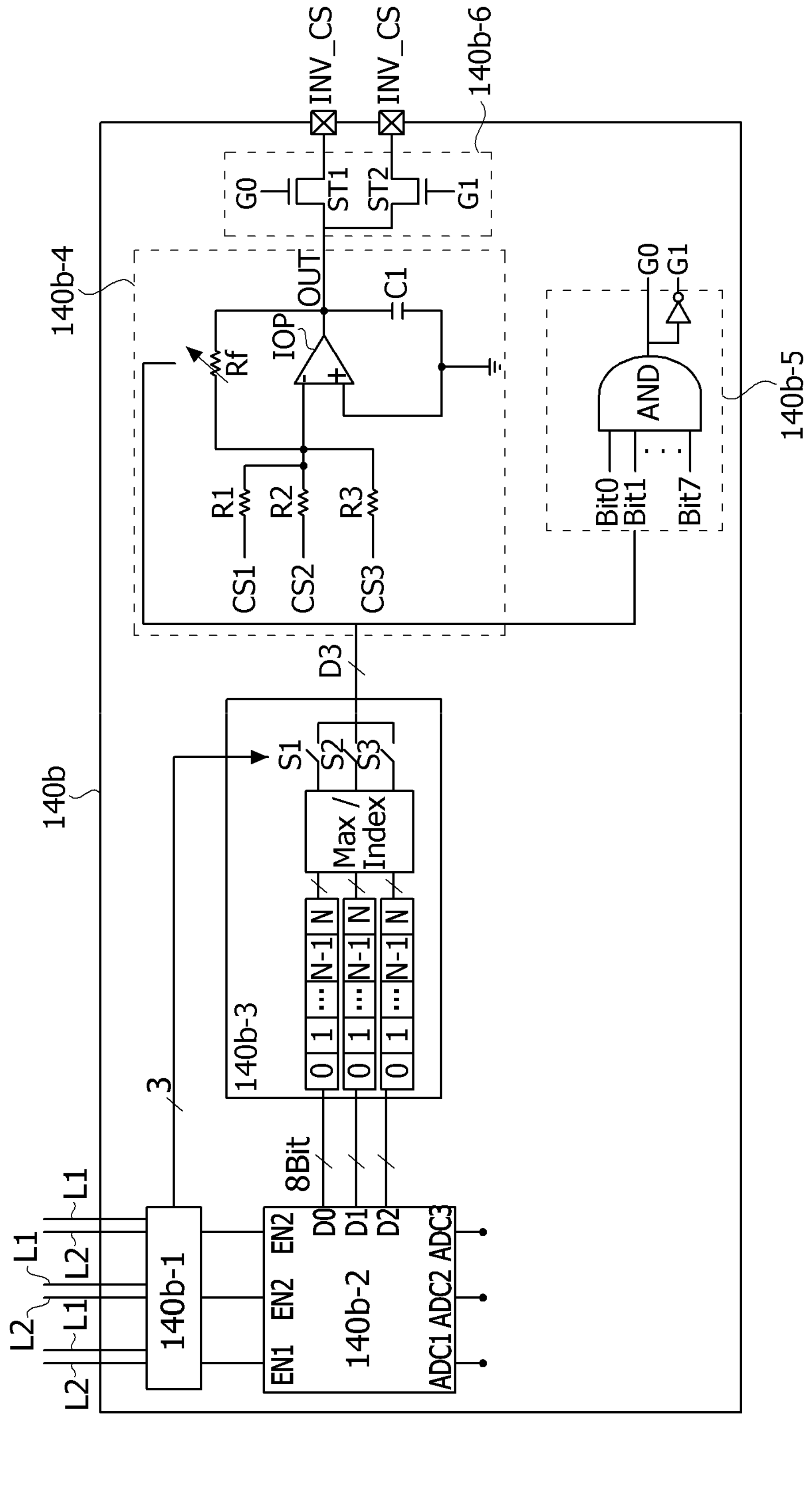
FIG. 15 is an exemplary view illustrating a detailed configuration of a pseudo signal generation circuit shown in FIG. 14.
Figure 19A:
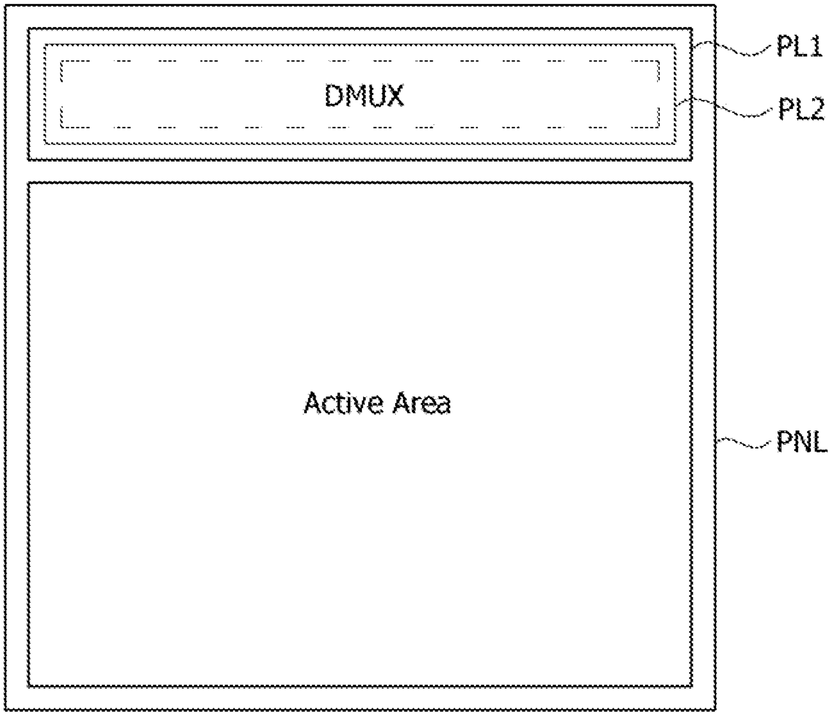
FIGS. 19A and 19B are exemplary views illustrating an arrangement form of pseudo signal lines shown in FIG. 14.
Figure 19B:
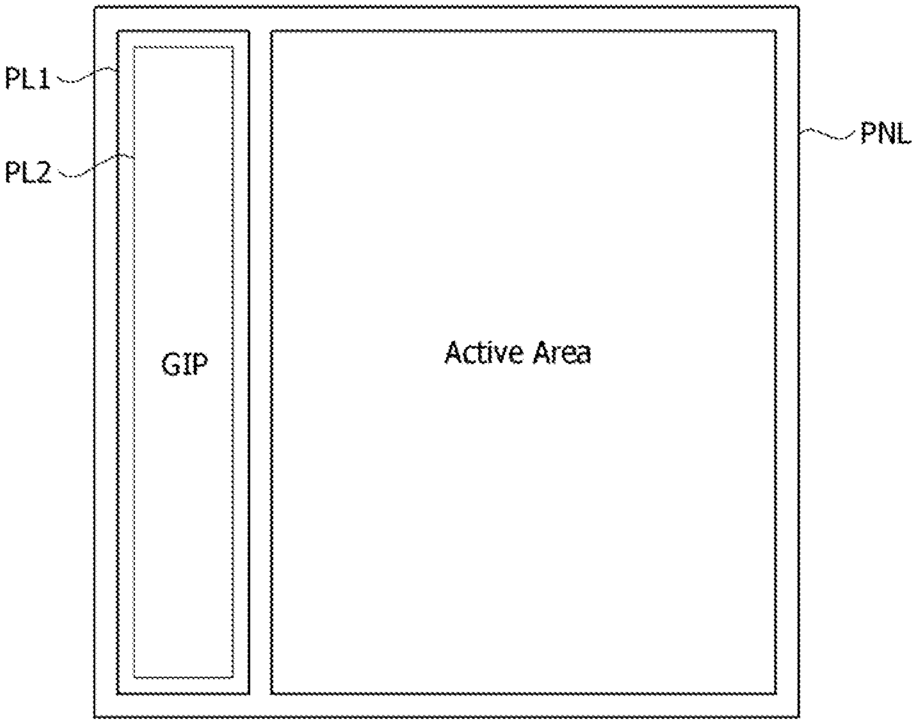

FIG. 14 is a view for describing an operation of a level shifter according to a second exemplary embodiment of the present disclosure, FIG. 15 is an exemplary view illustrating a detailed configuration of a pseudo signal generation circuit shown in FIG. 14, FIGS. 16 and 17 are exemplary views for describing a configuration and an operation of an adder shown in FIG. 15, FIG. 18 is an exemplary view for describing a configuration and an operation of a line selection circuit shown in FIG. 15, and FIGS. 19A and 19B are exemplary views illustrating an arrangement form of pseudo signal lines shown in FIG. 14.

Referring to FIG. 14, a level shifter 140 according to a second embodiment of the present disclosure can include a driving signal generation circuit 140*a*, a pseudo signal generation circuit 140*b*, a first pseudo signal line PL1, and a second pseudo signal line PL2.

Since the level shifter according to the second embodiment has the same configuration and operation as the level shifter according to the first embodiment shown in FIG. 3, and only a configuration which selectively applies a pseudo signal generated from the pseudo signal generation circuit 140*b* to two pseudo signal lines is different, only this configuration will be described.

Referring to FIG. 15, the pseudo signal generation circuit 140*b* according to the second embodiment can include an edge detection circuit 140*b*-1, a voltage measurement circuit 140*b*-2, a slew rate calculation circuit 140*b*-3, a signal inverting circuit 140*b*-4, an adder 140*b*-5, and a line selection circuit 140*b*-6.

The adder 140*b*-5 and the line selection circuit 140*b*-6 are added to the configurations in FIG. 5, and thus only these will be described.

The adder 140*b*-5 can add 8-bit data corresponding to the slew rate output from the slew rate calculation circuit 140*b*-3 and output a selection signal. Here, the selection signal can be '1' or '0.'

Referring to FIG. 16, the adder 140*b*-5 can include an AND gate AND and an inverter.

8-bit data is input to the AND gate AND and thus the selection signal is output, and different selection signals can be output to a first output node G0 and a second output node G1. The inverter is disposed at the second output node G1 to output an inverted signal of the signal output to the first output node G0.

For example, as shown in FIG. 17, in the case of 8-bit data [11111111] corresponding to the slew rate 255, '1' is output as the selection signal to the first output node G0, and '0' is output as the selection signal to the second output node G1.

As another example, in the case of 8-bit data [01001100] corresponding to the slew rate 50, '0' is output as the selection signal to the first output node G0, and '1' is output as the selection signal to the second output node G1.

As still another example, in the case of 8-bit data [01000010] corresponding to the slew rate 66, '0' is output as the selection signal to the first output node G0, and '1' is output as the selection signal to the second output node G1.

As shown in FIG. 18, the line selection circuit 140*b*-6 can include a first switch element or a second switch element.

The line selection circuit 140*b*-6 can turn on a first switch element ST1 or a second switch element ST2 according to the selection signal output from the adder 140*b*-5 to selectively apply the pseudo signal output from the signal inverting circuit 140*b*-4 to a first pseudo signal line PL1 or a second pseudo signal line PL2.

In this case, the first signal line PL1 and the second signal line PL2 can be formed to have different line widths.

The first signal line PL1 and the second signal line PL2 can be formed to surround a demultiplexer DMUX to which a MUX signal MUX is applied as a driving signal as shown in FIG. 19A, or formed to surround a gate driver GIP to which a clock signal CLK is applied as a driving signal as shown in FIG. 19B.

Here, an example in which the first signal line PL1 and the second signal line PL2 are formed as closed loops completely surrounding the demultiplexer DMUX and the gate driver GIP is illustrated, but they are not necessarily limited thereto, and can be formed to at least partially surround circuits which generate the driving signals such as the demultiplexer DMUX and the gate driver GIP.

Figure 20:
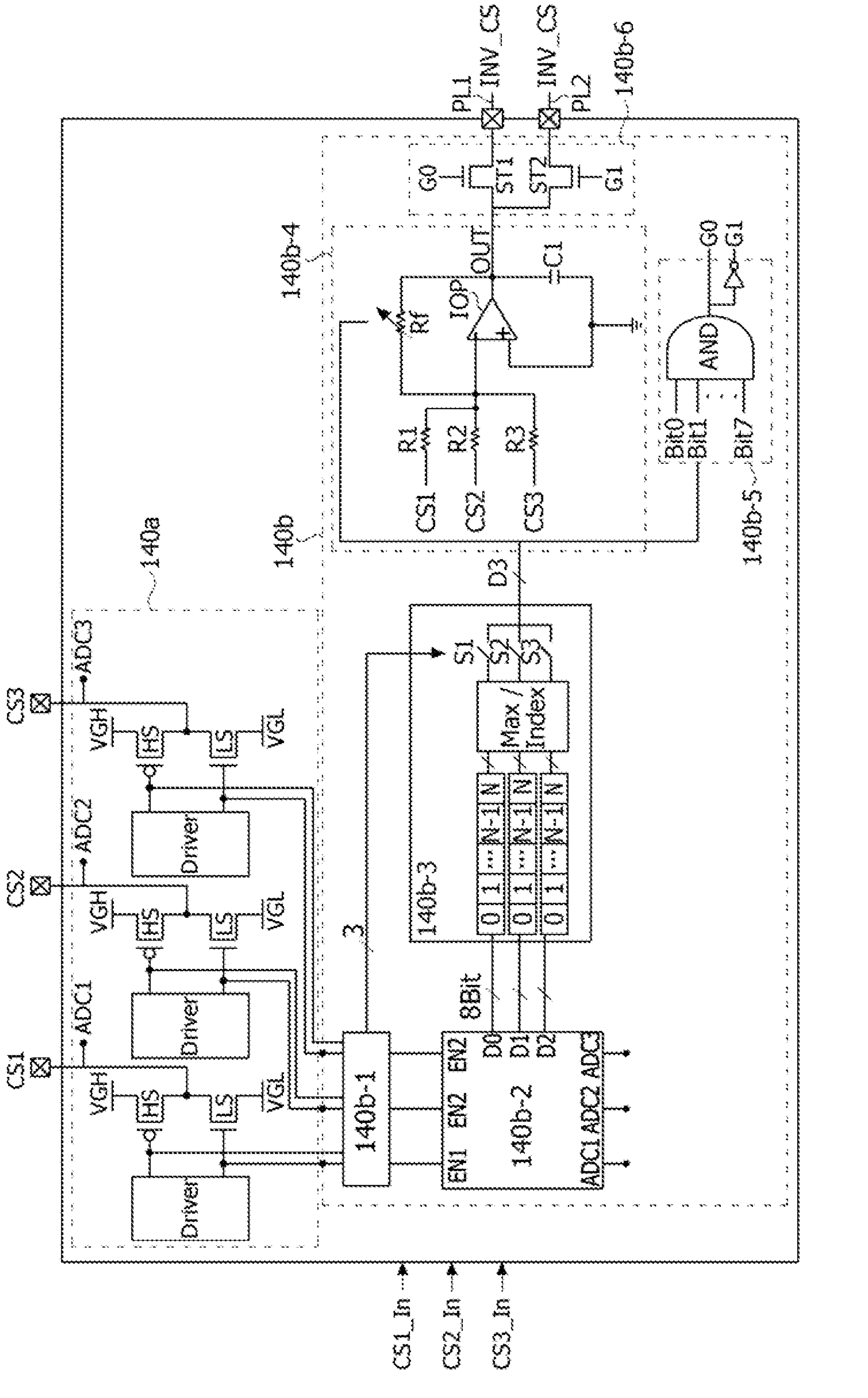
FIG. 20 is a view illustrating an implementation example of the level shifter according to an exemplary embodiment of the present disclosure.
Figure 21:
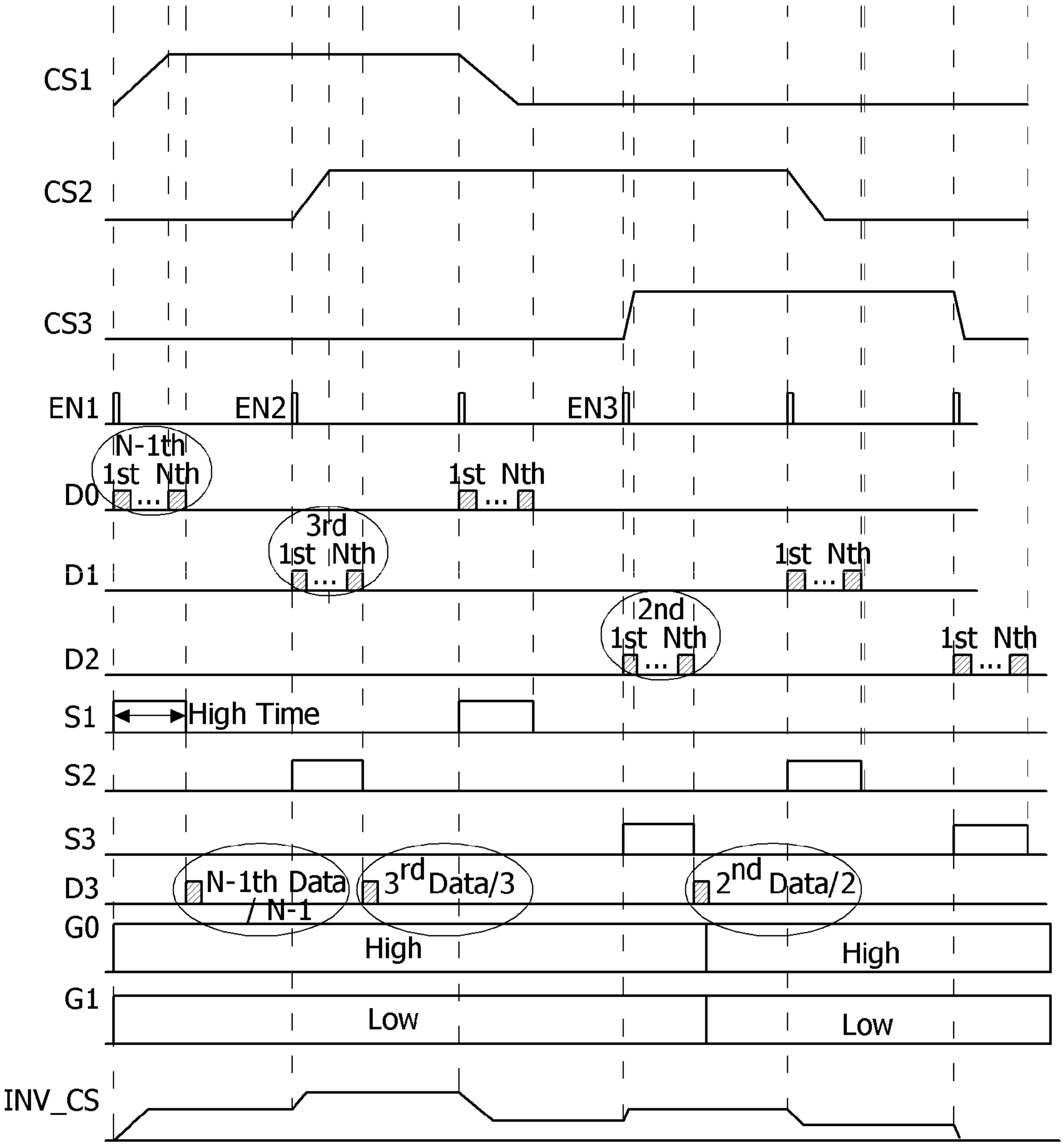
FIG. 21 is an exemplary view illustrating output waveforms and pseudo signals of the level shifter shown in FIG. 20.

FIG. 20 is a view illustrating an implementation example of the level shifter according to an exemplary embodiment of the present disclosure, and FIG. 21 is an exemplary view illustrating output waveforms and pseudo signals of the level shifter shown in FIG. 20.

Referring to FIGS. 20 and 21, a process of generating pseudo signals from a level shifter is shown.

A first driving signal CS1, a second driving signal CS2, and a third driving signal CS3 are output from circuit blocks in the driving signal generation circuit 140*a* of the level shifter according to the embodiment, and the edge detection circuit 140*b*-1 in the pseudo signal generation circuit 140*b* detects edges of the first driving signal CS1, the second driving signal CS2, and the third driving signal CS3 to input edge detection signals to terminals EN1, EN2, and EN3 of the voltage measurement circuit 140*b*-2.

The voltage measurement circuit 140*b*-2 measures voltage values of the first driving signal CS1, the second driving signal CS2, and the third driving signal CS3 according to the edge detection signals input through the terminals EN1, EN2, and EN3 and outputs the voltage values to terminals D0, D1, and D2.

The slew rates calculated by turning on the switches S1, S2, and S3 in the slew rate calculation circuit 140*b*-3 are sequentially output through the terminal D3, and the selection signals are output to terminals G0 and G1 from the adder 140*b*-5 according to the slew rate.

Here, a case in which an $N-1^{th}$ value is the greatest among the voltage values of the first driving signal, a $3^{rd}$ value is the greatest among the voltage values of the second driving signal, and a $2^{nd}$ value is the greatest among the voltage values of the third driving signal is shown.

A pseudo signal INV_CS generated from the pseudo signal inverting circuit 140*b*-4 according to the slew rate is output to the pseudo signal lines. Here, the pseudo signal is output to the first pseudo signal line PL1 when G0 is high and G1 is low, and is output to the second pseudo signal line PL2 when G0 is low and G1 is high.

Although the embodiments of the present disclosure have been described in more detail with reference to the accompanying drawings, the present disclosure is not limited thereto and can be embodied in many different forms without departing from the technical concept of the present disclosure. Therefore, the embodiments disclosed in the present disclosure are provided for illustrative purposes only and are not intended to limit the technical concept of the present disclosure. The scope of the technical concept of the present disclosure is not limited thereto. Therefore, it should be understood that the above-described embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A level shifter comprising:
- a driving signal generation circuit configured to output driving signals; and
- a pseudo signal generation circuit configured to generate a pseudo signal reflecting a transition of each of the driving signals,
- wherein a voltage level of the pseudo signal is raised or lowered with the transition of each of the driving signals.

2. The level shifter of claim 1, wherein a variation magnitude by which the voltage level of the pseudo signal is raised or lowered whenever the transition of each of the driving signals occurs, is adjusted according to the driving signals.

3. The level shifter of claim 2, wherein the variation magnitude is adjusted in proportion to a slew rate of the driving signals.

4. The level shifter of claim 2, wherein:
- the driving signal generation circuit includes a plurality of circuit blocks configured to output the driving signals; and
- each of the plurality of circuit blocks includes a pull-up transistor and a pull-down transistor configured to output one of the driving signals.

5. The level shifter of claim 4, wherein the pseudo signal generation circuit includes:
- an edge detection circuit configured to detect edges of the driving signals and output edge detection signals;
- a voltage measurement circuit configured to measure and output a voltage value of each driving signal when the edge detection signals are output;
- a slew rate calculation circuit configured to calculate a slew rate of each driving signal using the measured voltage value; and
- a signal inverting circuit configured to adjust the variation magnitude according to the calculated slew rate, and generate the pseudo signal using the adjusted variation magnitude.

6. The level shifter of claim 5, wherein the edge detection circuit includes:
- a first line having one end connected to a gate electrode of the pull-up transistor and another end connected to a node;
- an inverter disposed on the first line; and
- a second line having one end connected to a gate electrode of the pull-down transistor and another end connected to the node.

7. The level shifter of claim 5, wherein the slew rate calculation circuit includes:
- a plurality of buffers configured to store data corresponding to the voltage value of the driving signals;
- a calculation circuit configured to calculate the slew rate of each driving signal based on the data stored in the plurality of buffers; and
- a plurality of switches configured to be turned on according to the edge detection signal of each of the driving signals to output the data corresponding to the calculated slew rate.

8. The level shifter of claim 5, wherein the signal inverting circuit includes:
- an inverting amplifier having an inverting input end;
- a plurality of input terminals connected to the inverting input end of the inverting amplifier in parallel, and configured to receive the driving signals;
- a plurality of resistors disposed between the plurality of input terminals and the inverting input end of the inverting amplifier; and
- a feedback resistor connected between an output end of the inverting amplifier and the inverting input end of the inverting amplifier.

9. The level shifter of claim 8, wherein the feedback resistor is varied according to data corresponding to the calculated slew rate.

10. The level shifter of claim 8, wherein the pseudo signal generation circuit further includes:
- an adder configured to output a selection signal for selecting one of a plurality of pseudo signal lines according to the calculated slew rate; and
- a line selection circuit configured to apply the pseudo signal generated from the signal inverting circuit to one pseudo signal line selected according to the selection signal from the adder.

11. The level shifter of claim 10, wherein:
- the line selection circuit includes a plurality of switch elements connected to the plurality of pseudo signal lines; and
- each of the plurality of switch elements includes a first electrode connected to the output end of the inverting amplifier, a second electrode connected to a corresponding pseudo signal line, and a gate electrode to which the selection signal is applied.

12. The level shifter of claim 1, wherein a phase of the pseudo signal is inverted as the voltage level of the pseudo signal is raised or lowered.

13. The level shifter of claim 1, wherein the pseudo signal generation circuit adjusts the voltage level of the pseudo signal by a variation magnitude in a direction when the driving signals are on a rising edge that is opposite to that when the driving signals are on a falling edge in an overlapping section.

14. The level shifter of claim 1, wherein the driving signals include multiplex signals applied to demultiplexers and clock signals applied to gate drivers.

15. A display device comprising:
- a display panel including a plurality of signal lines and at least one pseudo signal line;
- a driving signal generation circuit configured to output a plurality of driving signals through the plurality of signal lines; and
- a pseudo signal generation circuit configured to generate a pseudo signal reflecting a transition of each of the plurality of driving signals, and output the pseudo signal to the at least one pseudo signal line, wherein a voltage level of the pseudo signal is raised or lowered with the transition each of the plurality of driving signals.

16. The display device of claim 15, wherein the at least one pseudo signal line surrounds at least a portion of a demultiplexer or a gate driver.

17. The display device of claim 15, wherein the pseudo signal generation circuit adjusts the voltage level of the pseudo signal by a variation magnitude in a direction when the plurality of driving signals are on a rising edge that is opposite to that when the plurality of driving signals are on a falling edge in an overlapping section.

18. The display device of claim 15, wherein the pseudo signal generation circuit includes:

an edge detection circuit configured to detect edges of the plurality of driving signals and output edge detection signals;

a voltage measurement circuit configured to measure and output a voltage value of each driving signal when the edge detection signals are output;

a slew rate calculation circuit configured to calculate a slew rate of each driving signal using the measured voltage value; and a signal inverting circuit configured to adjust a variation magnitude according to the calculated slew rate, and generate the pseudo signal using the adjusted variation magnitude.

19. The display device of claim 18, wherein:

the at least one pseudo signal line includes a plurality of pseudo signal lines; and the pseudo signal generation circuit further includes:

an adder configured to output a selection signal for selecting one of the plurality of pseudo signal lines having different line widths according to the calculated slew rate; and a line selection circuit configured to apply the pseudo signal generated from the signal inverting circuit to one pseudo signal line selected according to the selection signal from the adder.

20. The display device of claim 19, wherein the plurality of pseudo signal lines have different line widths and are disposed in parallel to each other.

* * * * *